(12) United States Patent
Chang

(10) Patent No.: US 11,614,119 B2
(45) Date of Patent: Mar. 28, 2023

(54) UNIVERSAL SOCKET

(71) Applicant: Chi-Fong Chang, Taichung (TW)

(72) Inventor: Chi-Fong Chang, Taichung (TW)

(*) Notice: Subject to any disclaimer, the term of this patent is extended or adjusted under 35 U.S.C. 154(b) by 147 days.

(21) Appl. No.: 17/345,872

(22) Filed: Jun. 11, 2021

(65) Prior Publication Data
US 2022/0034359 A1    Feb. 3, 2022

(30) Foreign Application Priority Data

Jul. 31, 2020 (TW) .................................. 109125967

(51) Int. Cl.
*F16C 11/06* (2006.01)
(52) U.S. Cl.
CPC ............................ *F16C 11/0623* (2013.01)
(58) Field of Classification Search
CPC .............. F16C 11/0623; F16C 11/0604; F16C 11/0647; F16C 11/0628; B25B 23/0028; B25B 23/12; B25B 23/0035; F16D 3/18; F16D 3/185; F16D 3/20
See application file for complete search history.

(56) References Cited

U.S. PATENT DOCUMENTS

| | | | | |
|---|---|---|---|---|
| 2,895,314 A * | 7/1959 | Helm | ................. | F16D 3/20 464/153 |
| 3,897,703 A * | 8/1975 | Phipps | ................. | B25B 13/06 81/177.75 |
| 4,188,801 A * | 2/1980 | Hugh | ................. | F16D 3/20 464/106 |
| 5,069,569 A * | 12/1991 | Lieser | ................. | F16D 3/20 403/57 |
| 5,738,586 A * | 4/1998 | Arriaga | ................. | F16D 1/101 464/106 |
| 5,851,151 A * | 12/1998 | Reynolds | ................. | B25B 13/06 464/106 |
| 6,869,366 B2 * | 3/2005 | Delaney | ................. | B25B 13/06 81/177.75 |
| 7,854,659 B2 * | 12/2010 | Rom | ................. | F16D 3/18 464/106 |
| 8,366,339 B2 * | 2/2013 | Lin | ................. | F16D 1/108 403/57 |
| 11,041,523 B2 * | 6/2021 | Chen | ................. | F16C 11/0685 |

* cited by examiner

*Primary Examiner* — Daniel J Wiley

(57) ABSTRACT

A universal socket includes a barrel seat, a resilient member and a rotating component. The barrel seat has an inner wall surface having four receiving surface portions, and four linking surface portions each connected between two adjacent ones of the receiving surface portions and having two flat surface segments. The rotating portion is retained in the barrel seat, and has four corner surfaces corresponding in position to the receiving surface portions, respectively, and four contacting surfaces each connected between two adjacent ones of the corner surfaces and biased by the resilient member to abut against one of the flat surface segments.

10 Claims, 15 Drawing Sheets

UNIVERSAL SOCKET

CROSS-REFERENCE TO RELATED APPLICATION

This application claims priority of Taiwanese Patent Application No. 109125967, filed on Jul. 31, 2020.

FIELD

The disclosure relates to an assembling tool, and more particularly to a universal socket.

BACKGROUND

Referring to FIGS. 1 and 2, a conventional universal socket 8 includes a receiving seat 81, a tool component 82 and a C-shaped retaining ring 83. The receiving seat 81 has a receiving slot 811, and a drive hole 812 opposite to the receiving slot 811. An inner surface 810 of the receiving slot 811 is formed with a plurality of convex portions 813 that are spaced apart from each other and that extend longitudinally. The drive hole 812 is adapted to receive a power source (not shown), such as a pneumatic power device, an electric device or a hand tool. The tool component 82 is adjustably received in the receiving slot 811 of the receiving seat 81. The tool component 82 and the receiving seat 81 are connected in a manner that torque can be transmitted from the power source to the tool component 82. The tool component 82 has a mounting segment 821, a hexagonal ball head 822 opposite to the mounting segment 821, and a spring-biased ball unit 823. The mounting segment 821 is adapted to be mounted with a tool (not shown) such as a sleeve or a screwdriver. The hexagonal bail head 822 has six flat surfaces 824 that correspond respectively in position to the convex portions 813 of the receiving seat 81, and that are configured to abut against the convex portions 813, and six edge portions 825 that are connected to the flat surfaces 824. The spring-biased ball unit 823 is mounted in one of the flat surfaces 824 of the hexagonal ball head 822, and abuts resiliently against the inner surface 810 of the receiving seat 81. The C-shaped retaining ring 83 is mounted in the receiving seat 81 and is configured to restrict motions of the edge portions 825 of the hexagonal bail head 822, such that the tool component 82 is prevented from being removed from the receiving seat 81 and is rotatable relative to the receiving seat 81.

Referring to FIGS. 3 and 4, another conventional universal socket 9 includes a receiving seat 91, a tool component 92, a spring 94 and a C-shaped retaining ring 93. The receiving seat 91 has a receiving slot 911, and a drive hole 912 opposite to the receiving slot 911. An inner surface 910 of the receiving slot 911 is formed with four rib portions 913, and four grooves 914 that are spaced apart from each ether and that extend longitudinally. The tool component 92 is adjustably received in the receiving slot 911 and is connected to the receiving seat 91 for transmitting torque therefrom. The tool component 92 has a mounting segment 921, and a generally spherical head 922 opposite to the mounting segment 921. The spherical head 922 has four strip portions 923 that protrude from an outer surface of the spherical head 922 and that are spaced apart from each other, and four recesses 924 that are formed in the outer surface of the spherical head 922. The strip portions 923 are respectively received in the grooves 914 and are configured to abut against the inner surface 910. The spring 94 is mounted between the spherical head 922 and the receiving seat 91 and is configured to bias the spherical head 922 to move outward. The C-shaped retaining ring 93 is mounted in the receiving seat 91 and is configured to restrict motions of the strip portions 923, such that the tool component 92 is prevented from being removed from the receiving seat 91, and torque can be transmitted via engagement between the strip portions 923 of the tool component 92 and the grooves 924 of the receiving seat 91.

For both the above-mentioned conventional universal sockets 8, 9, due to the configurations of the tool components 82, 92 thereof (i.e. the edge portions 825 of the first conventional universal socket 8 and the strip portions 923 of the second conventional universal socket), the volumes thereof are relatively large.

SUMMARY

Therefore, the object of the disclosure is to provide a universal socket that can alleviate at least-one of the drawbacks of the prior art.

According to the disclosure, a universal socket includes a barrel seat, a resilient member, a rotating component and a retaining unit.

The barrel seat includes a surrounding wall that surrounds a center line, and that has an inner wall surface, an outer wall surface, a first surface and a second surface. The inner wall surface surrounds the center line and defines a driver hole, a receiving slot that is opposite to the driver hole along the center-line, and an installation slot that is disposed between the driver hole and the receiving slot, and that is spatially connected to the receiving slot. The outer wall surface is opposite to the inner wall surface. The first surface interconnects the inner wall surface and the outer wall surface, and surrounds an end of the receiving slot. The second surface is opposite to the first surface in the direction of the center line, interconnects the inner wall surface and the outer wall surface, and surrounds an end of the driver hole. The inner wall surface has four receiving surface portions that surround the receiving slot, and that are arranged symmetrically about the center line, and four linking surface portions that surround the receiving slot. Each of the linking surface portions is connected between two adjacent ones of the receiving surface portions, and has two flat surface segments that are inclined with respect to each other in a manner that the linking surface portions are convex toward the center line.

The resilient member is disposed in the barrel seat, is compressible, and has an inner end that is received in the installation slot and distal from the first surface, and an outer end that is proximate to the first surface.

The rotating component is rotatably connected to the barrel seat, abuts against the resilient member, and extends along an axis. The rotating component includes a rotating portion and an installation portion. The rotating portion is rotatably received in the receiving slot, has a cross section perpendicular to the axis that is generally a square with rounded corners, abuts against the outer end of the resilient member, and has four corner surfaces that surround the axis, and four contacting surfaces that surround the axis. Each of the corner surfaces corresponds in position to a respective one of the receiving surface portions of the inner wall surface. Each of the contacting surfaces is connected between two adjacent ones of the corner surfaces, and is configured to abut against one of the flat surface segments of a respective one of the linking surface portions of the inner wall surface. The installation portion is opposite to the rotating portion along the axis.

The retaining unit is mounted in the barrel seat such that the rotating component is prevented from being removed from the barrel seat.

Two imaginary lines that extend in a first direction perpendicular to the axis, and that are respectively tangent to two opposite ones of the contacting surfaces are defined as first tangent lines. Two imaginary lines that extend in a second direction perpendicular to the first direction and the axis, and that are respectively tangent to the other two opposite ones of the contacting surfaces are defined as second tangent lines. The first tangent lines and the second tangent lines intersect each other at four intersection points. Each of the corner surfaces is disposed between an adjacent one of the intersection points and the axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
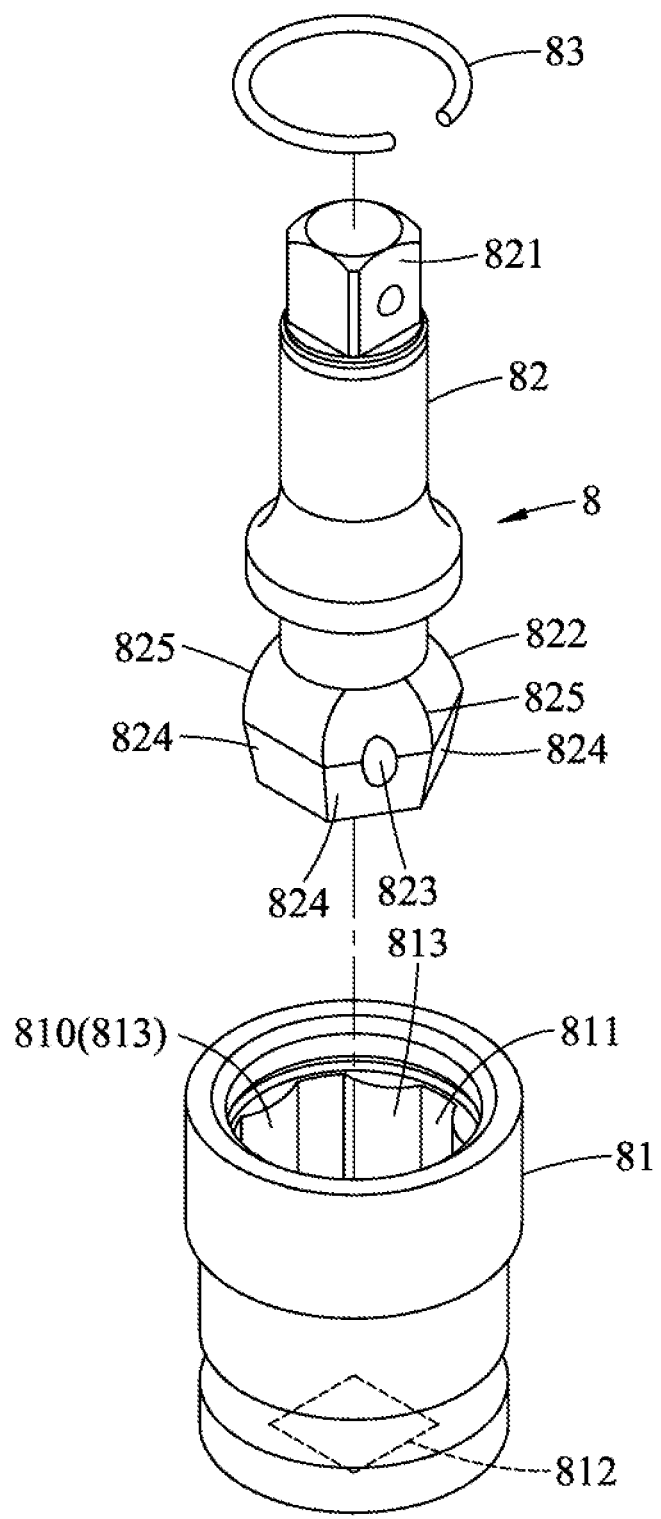
FIG. 1 is an exploded perspective view of a conventional universal socket.
Figure 2:
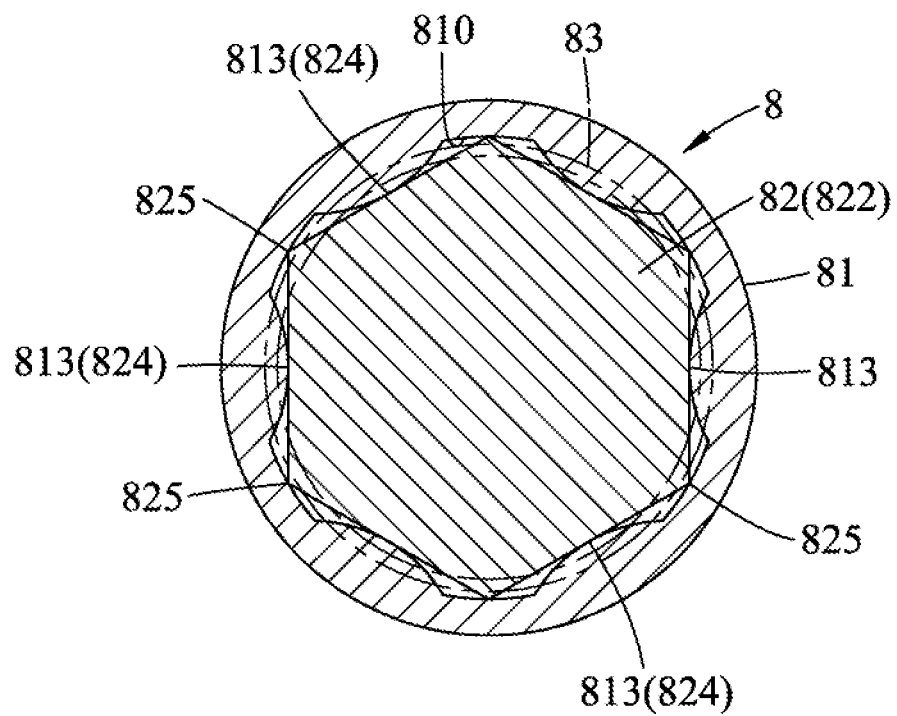
FIG. 2 is a sectional view of the conventional universal socket shown in FIG. 1.
Figure 3:
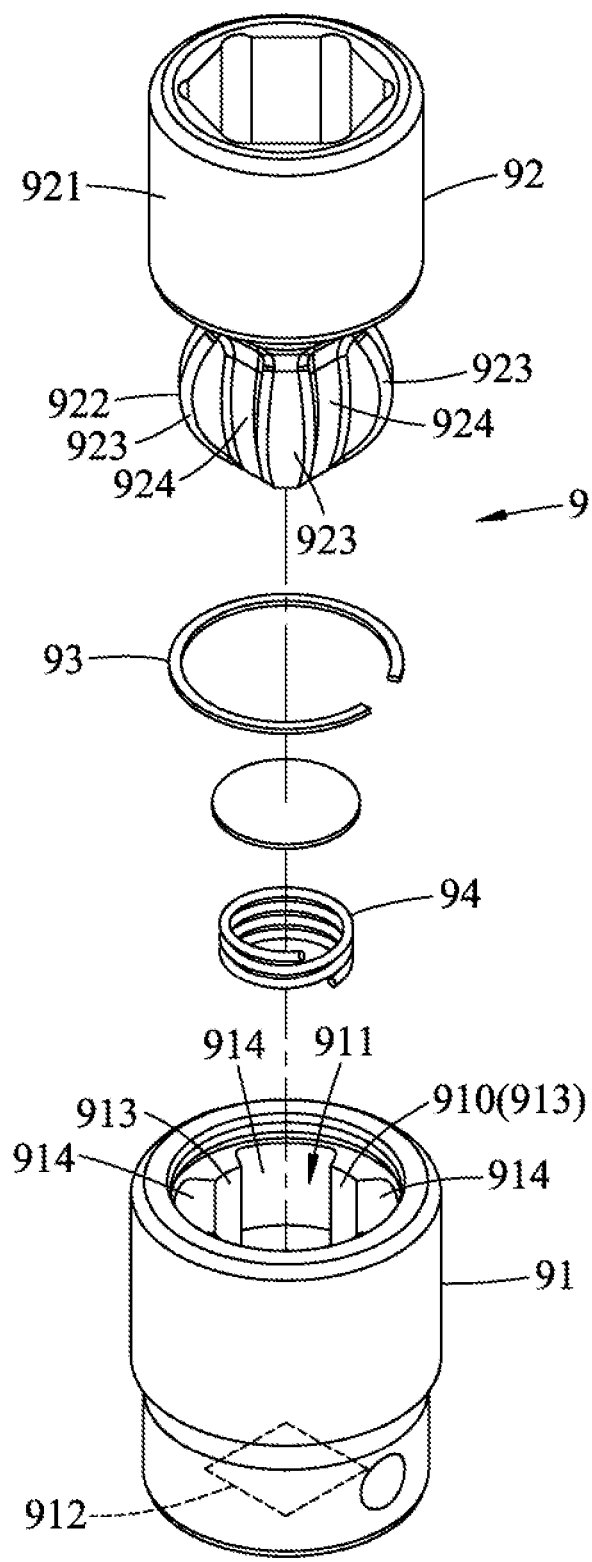
FIG. 3 is an exploded perspective view of another conventional universal socket.
Figure 4:
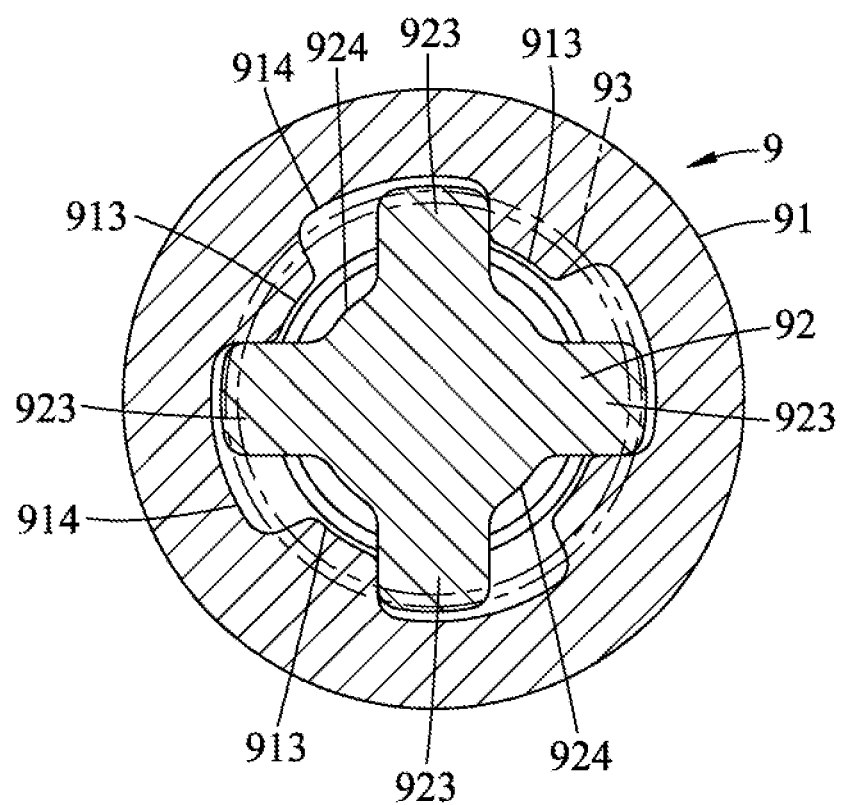
FIG. 4 is a sectional view of the conventional universal socket shown in FIG. 3.
Figure 5:
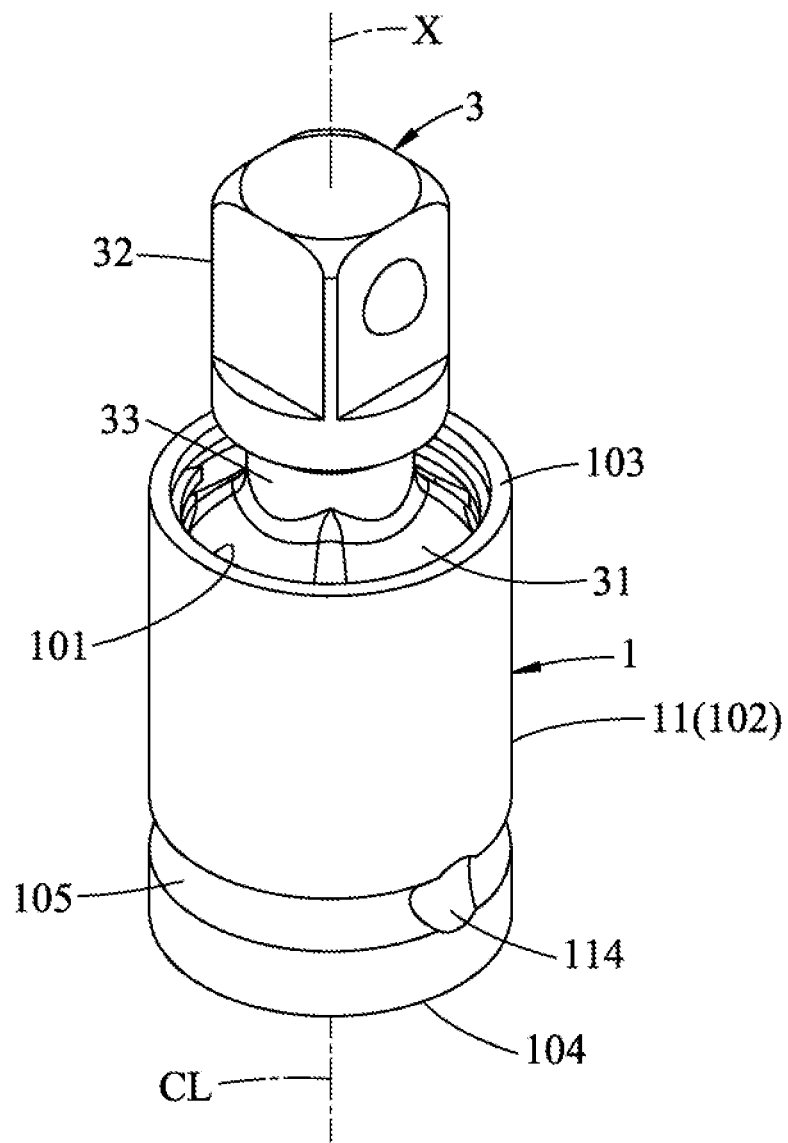
FIG. 5 is a perspective view of an embodiment of a universal socket according to the disclosure, illustrating a center line of a barrel seat of the embodiment coinciding with an axis of a rotating component of the embodiment.
Figure 7:
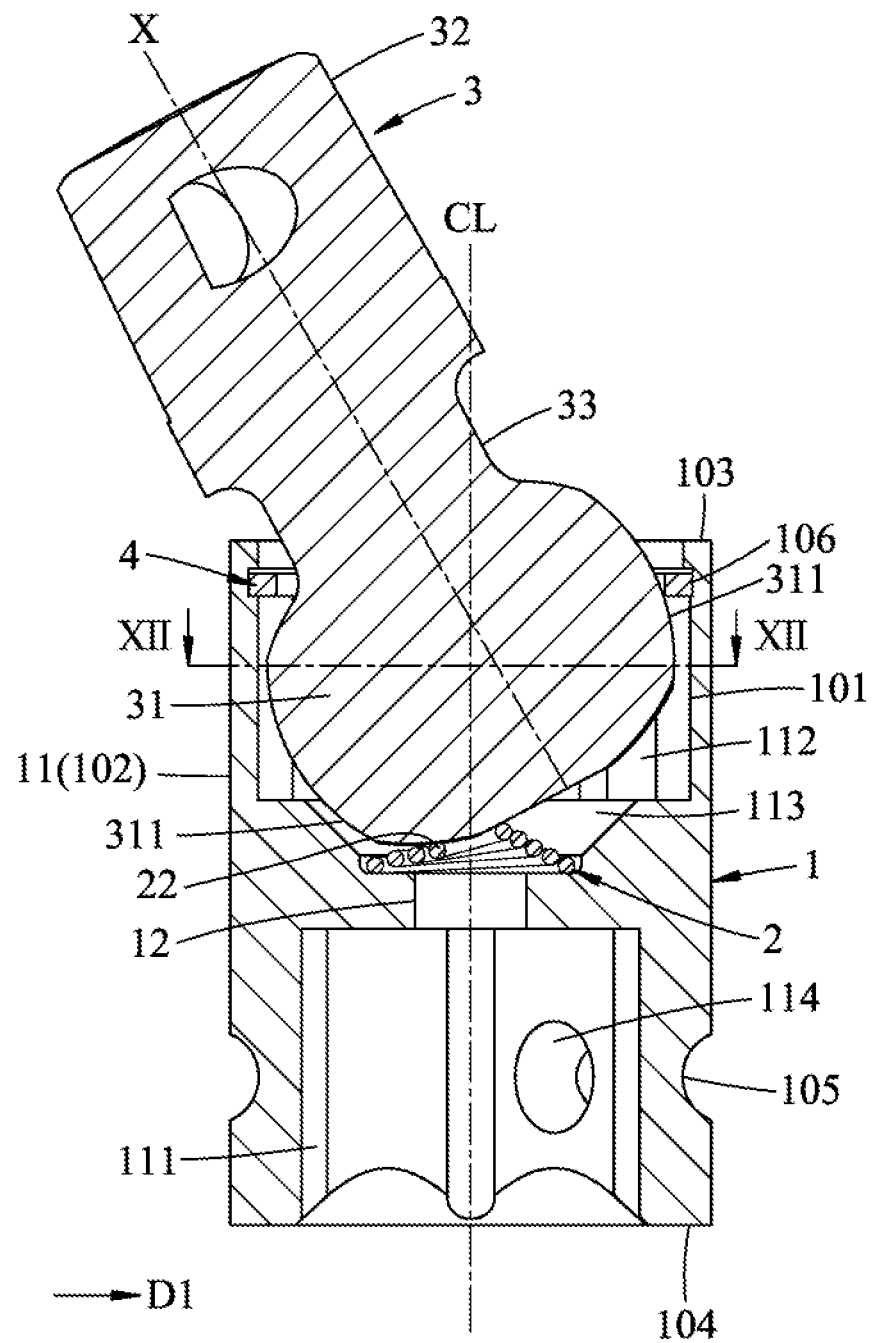
FIG. 7 is a sectional view taken along line VII-VII of FIG. 6.

Referring to FIGS. 5 and 7, an embodiment of a universal socket according to the disclosure includes a barrel seat 1, a resilient member 2, a rotating component 3 and a retaining unit 4.

The barrel seat 1 is substantially barrel shaped, and includes a surrounding wall 11 and a base wall 12. The surrounding wall 11 and the base wall 12 are molded as one piece. The surrounding wall 11 surrounds a center line (CL), and has an inner wall surface 101, an outer wall surface 102, a first surface 103 and a second surface 104. The outer wall surface 102 is opposite to the inner wall surface 101. The first surface 103 interconnects the inner wall surface 101 and the outer wall surface 102, and surrounds an end of the receiving slot 112. The second surface 104 is opposite to the first surface 103 in the direction of the center line (CL), and interconnects the inner wall surface 101 and the outer wall surface 102. The first surface 103 and the second surface 104 are substantially parallel to each other, and are substantially perpendicular to the center line (CL).

The inner wall surface 101 surrounds the center line (CL), and defines a driver hole 111, a receiving slot 112 that is opposite to the driver hole 111 along the center line (CL), and an installation slot 113 that is disposed between the driver hole 111 and the receiving slot 112, and that is spatially connected to the receiving slot 112.

The driver hole 111 has an end surrounded by the second surface 104, and is adapted to be mounted with a power source (not shown), such as a pneumatic power device or a hand tool. In the present embodiment, the driver hole 111 is a square hole; however, in variations of the embodiment, it may have other non-circular shapes, and can still be mounted with the power source. The receiving slot 112 has an end surrounded by the first surface 103.

The outer wall surface 102 is formed with an outer annular groove 105 that surrounds the center line (CL), and that is proximate to and distal from the driver hole 111 and the receiving slot 112, respectively. The outer-annular groove 105 is adapted to provide a better grip for a user to hold the barrel seat 1.

The surrounding wall 11 further has two through holes 114 that extend in a direction perpendicular to the center line (CL), that are spatially connected to the outer annular groove 105, and that are arranged along a same imaginary line. Each of the through holes 114 extends from the outer wall surface 102 to the inner wall surface 101, and is spatially connected to the driver hole 111. The through holes 114 are adapted to be engaged with the power source to provide a positioning effect. In variations of the embodiment, the number of the through hole 114 may be one.

Figure 8:
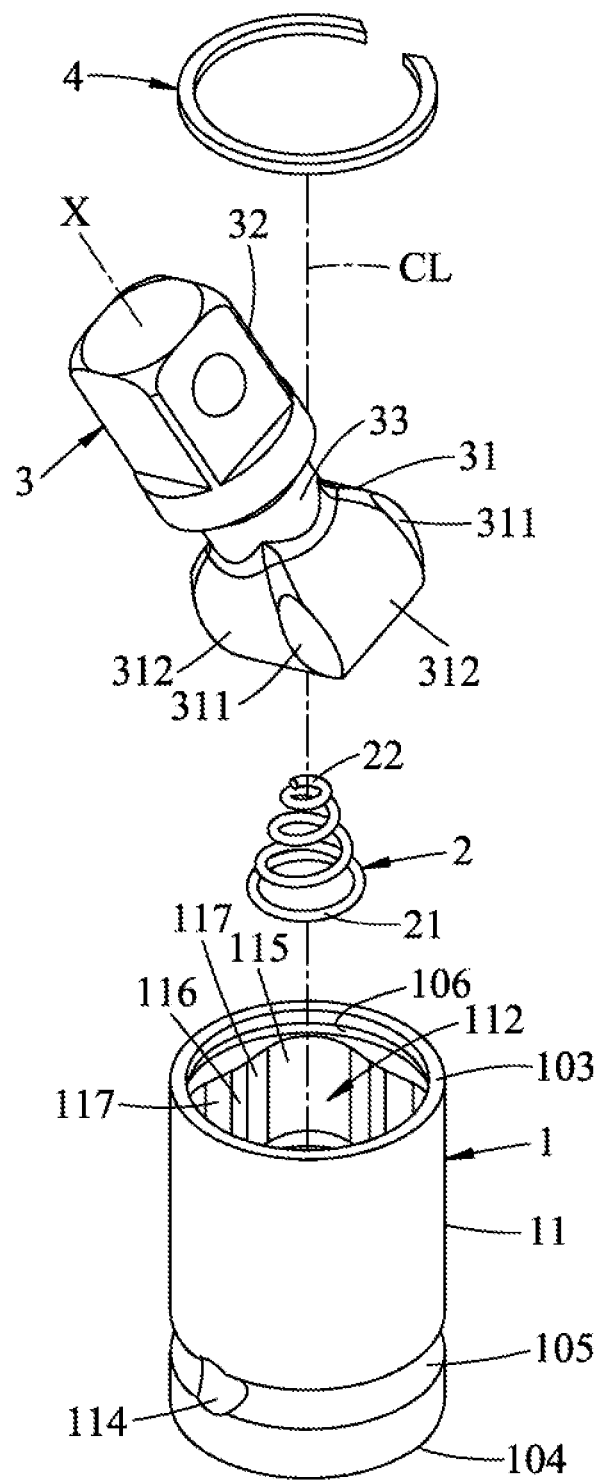
FIG. 8 is an exploded top perspective view of the embodiment.
Figure 9:
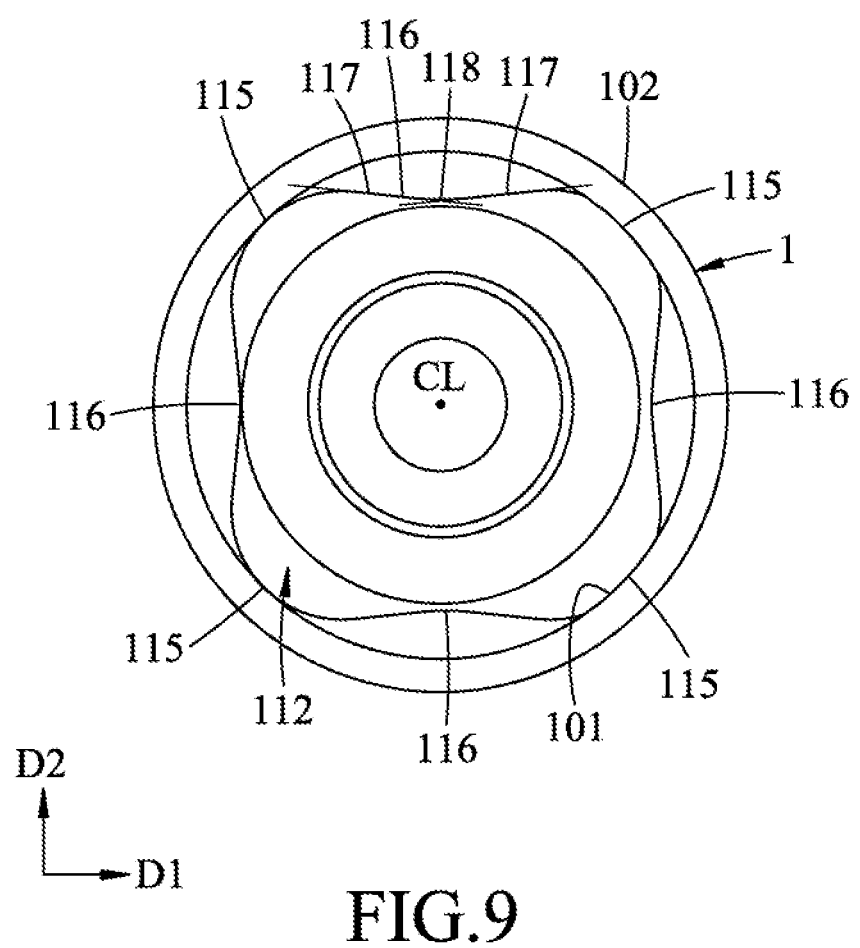
FIG. 9 is a top view of the barrel seat.

Referring to FIGS. 7 to 9, the inner wall surface 101 has a retaining groove 106 that is spatially connected to the receiving slot 112, that is proximate to the first surface 103, and that surrounds the center line (CL). The base wall 12 is integrally connected to the inner wall surface 101 of the surrounding wall 11 as one piece, is disposed between the driver hole 111 and the installation slot 113, and is perpendicular to the center line (CL).

Referring to FIG. 9, the receiving slot 112 has a cross section that is perpendicular to the axis (X) being generally a square with rounded corners. The inner wall surface 101 has four receiving surface portions 115 and four linking surface portions 116. The receiving surface portions 115 surround the receiving slot 112, extend in the direction of the center line (CL), and are arranged symmetrically about the center line (CL). The linking surface portions 116 surround the receiving slot 112. Each of the receiving surface portions 115 is connected between two adjacent ones of the linking surface portions 116 (i.e., each of the linking surface portions 116 is connected between two adjacent ones of the receiving surface portions 115). Each of the linking surface portions 116 has two flat surface segments 117, and a curved surface segment 118 that is connected between the flat surface segments 117 The flat surface segments 117 are inclined with respect to each other in a manner that the linking surface portions 116 are convex toward the center line (CL).

The resilient member 2 is disposed in the barrel seat 1, and is compressible. In the present embodiment, the resilient member 2 is configured as a conical compression spring, and has an inner end or a large diameter end 21 that is received in the installation slot 113 of the barrel seat 1 and that is distal from the first, surface 103 of the barrel seat 1, and an outer end or a small diameter end 22 that is opposite to the large diameter end 21 and that is proximate to the first surface 103 of the barrel seat 1. Since the resilient member 2 is of a conical shape, it has relatively large freedom and great resilience, and is less susceptible to spring fatigue. In variations of the embodiment, the resilient member 2 may be configured as a cylindrical compression spring having a constant diameter.

Figure 6:
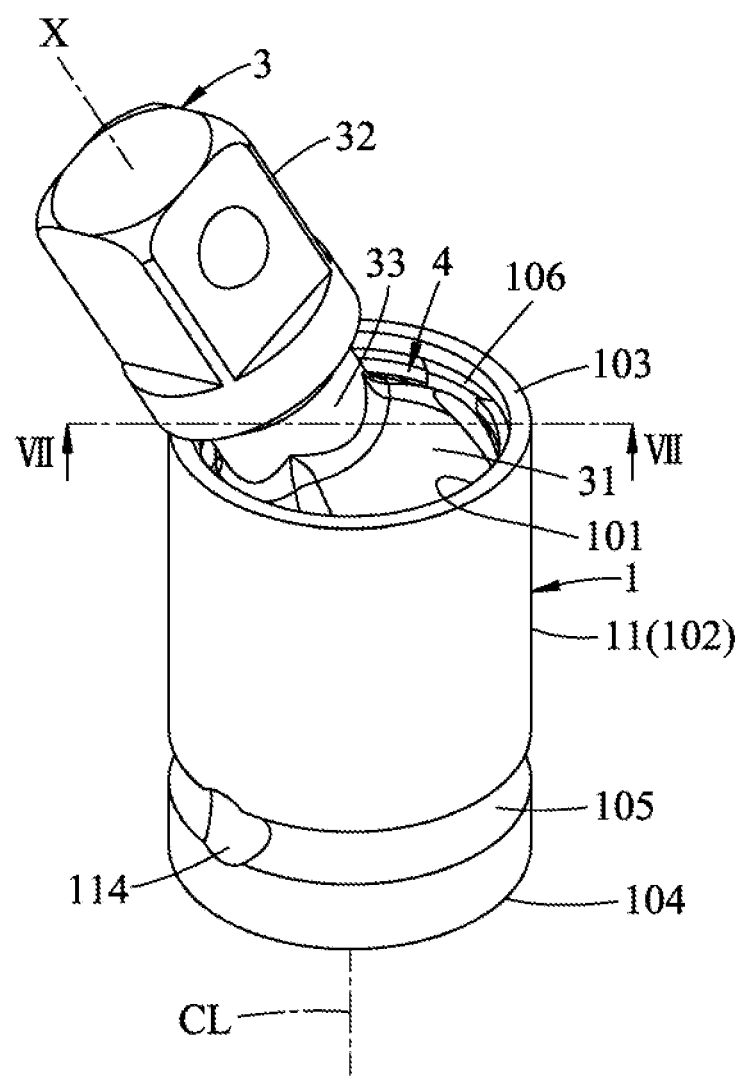
FIG. 6 is a view similar to FIG. 5, illustrating the center line being inclined relative to the axis.

Referring to FIGS. 5 to 7, the rotating component 3 is rotatably connected to the barrel seat 1, abuts against, the resilient member 2, and extends along an axis (X). It should be noted that, the axis (X) may coincide with the center line (CL) or be transverse to the center line (CL). The rotating component 3 includes a rotating portion 31 that is rotatably received in the receiving slot 112 of the barrel seat 1, an installation portion 32 that is opposite to the rotating portion 31 along the axis (X), and a neck portion 33 that is connected between the rotating portion 31 and the installation portion 32.

Figure 10:
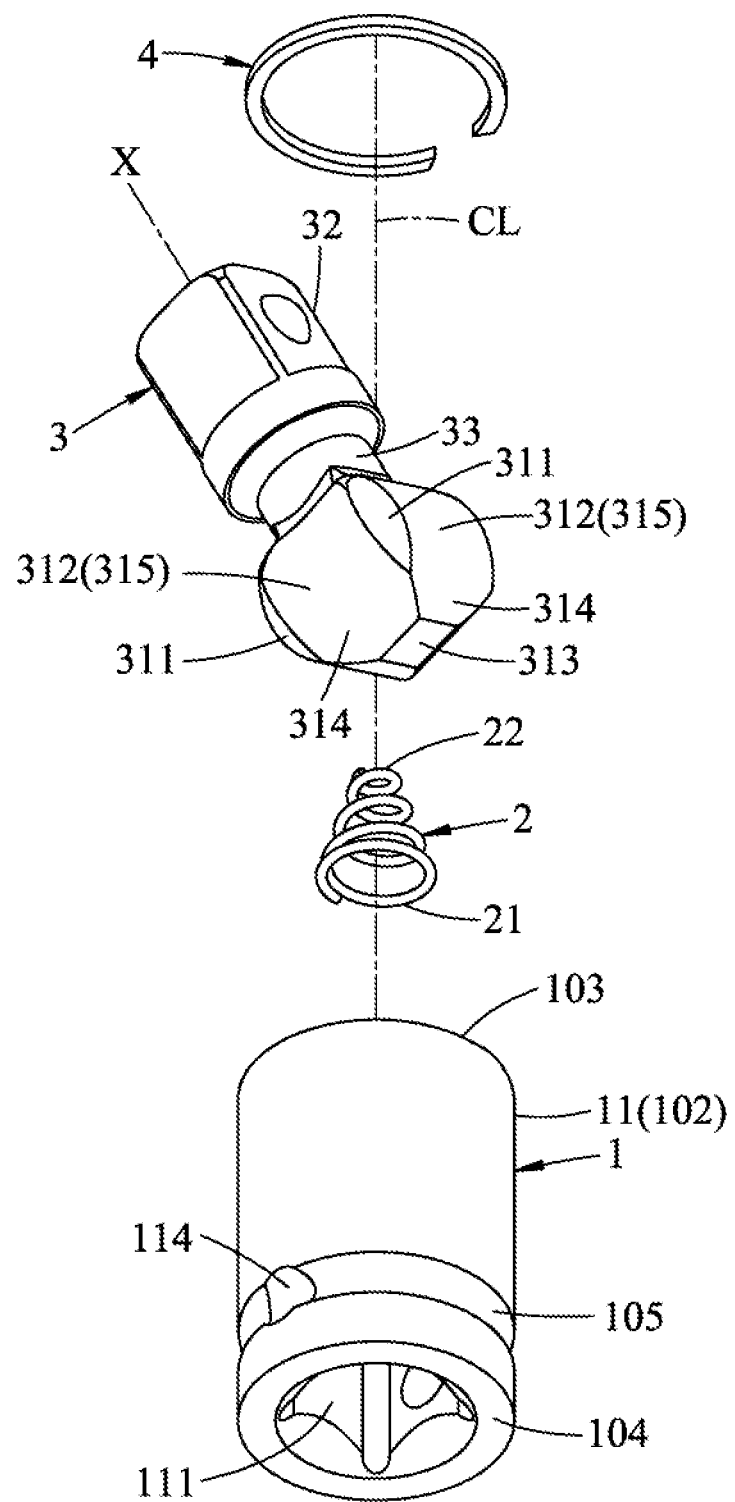
FIG. 10 is and exploded bottom perspective view of the embodiment.
Figure 11:
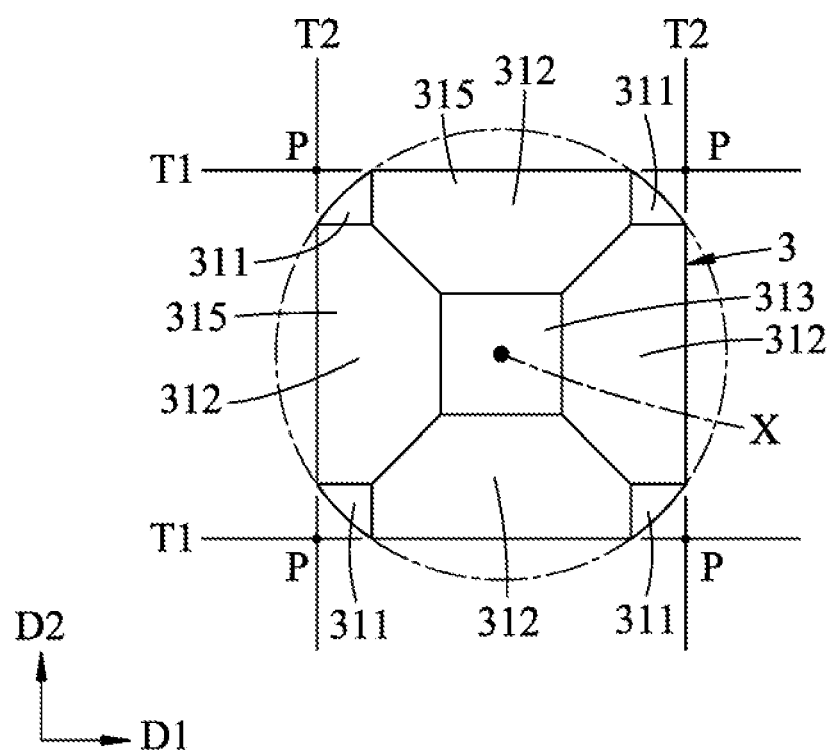
FIG. 11 is a bottom view of the rotating component.
Figure 12:
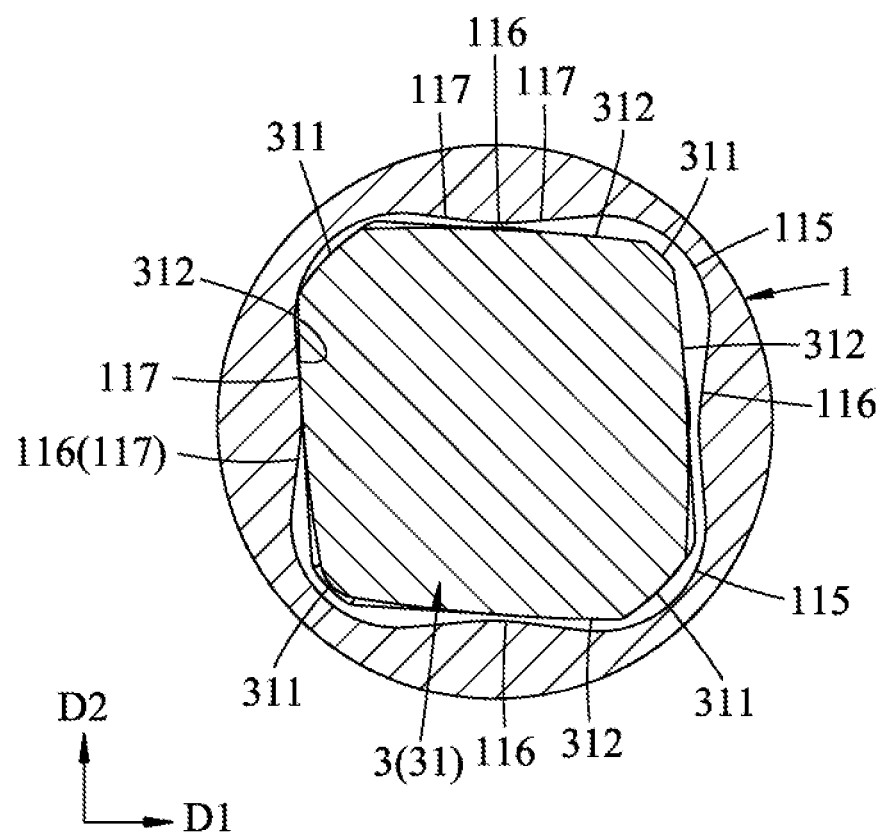
FIG. 12 is a sectional view taken along line XII-XII of FIG. 7.

Referring to FIGS. 10, 11 and 12, the rotating portion 31 abuts against the small diameter end 22 of the resilient member 2, and has four corner surfaces 311 that surround the axis (X), and four contacting surfaces 312 that surround the axis (X).

Each of the corner surfaces 311 corresponds in position to a respective one of the receiving surface portions 115 of the inner wall surface 101 of the barrel seat 1. Each of the contacting surfaces 312 is connected between two adjacent ones of the corner surfaces 311 (i.e., each of the corner surfaces 311 is connected between two adjacent ones of the contacting surfaces 312), faces a respective one of the linking surface portions 116 of the inner wall surface 101, and is configured to abut against one of the flat surface segments 117 of the respective one of the linking surface portions 116 of the inner wall surface 101. As such, the present embodiment is able to transmit high torque via surface contacts between the contacting surfaces 312 and the linking surface portions 116.

Figure 14:
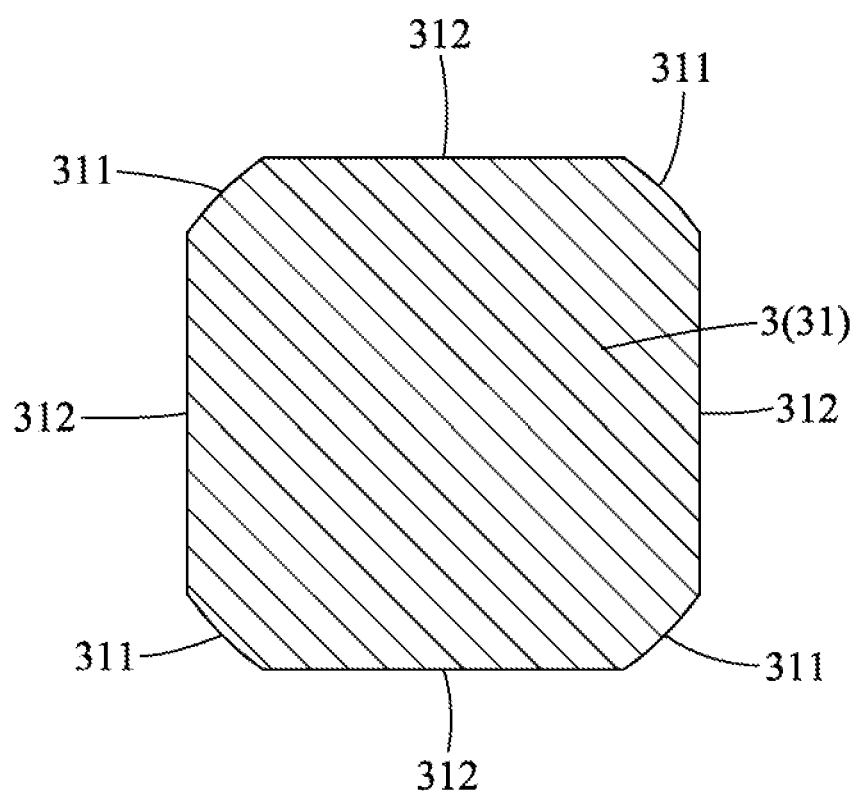
FIG. 14 is a sectional view taken along line XIV-XIV of FIG. 13.

Referring to FIGS. 11 and 14, the rotating portion 31 has a cross section perpendicular to the axis (X) that is generally a square with rounded corners. Each of the corner surfaces 311 of the rotating component 3 has a cross section perpendicular to the axis (X) being an arced line, and the cross sections of the corner surfaces 311 are co-circular.

Figure 13:
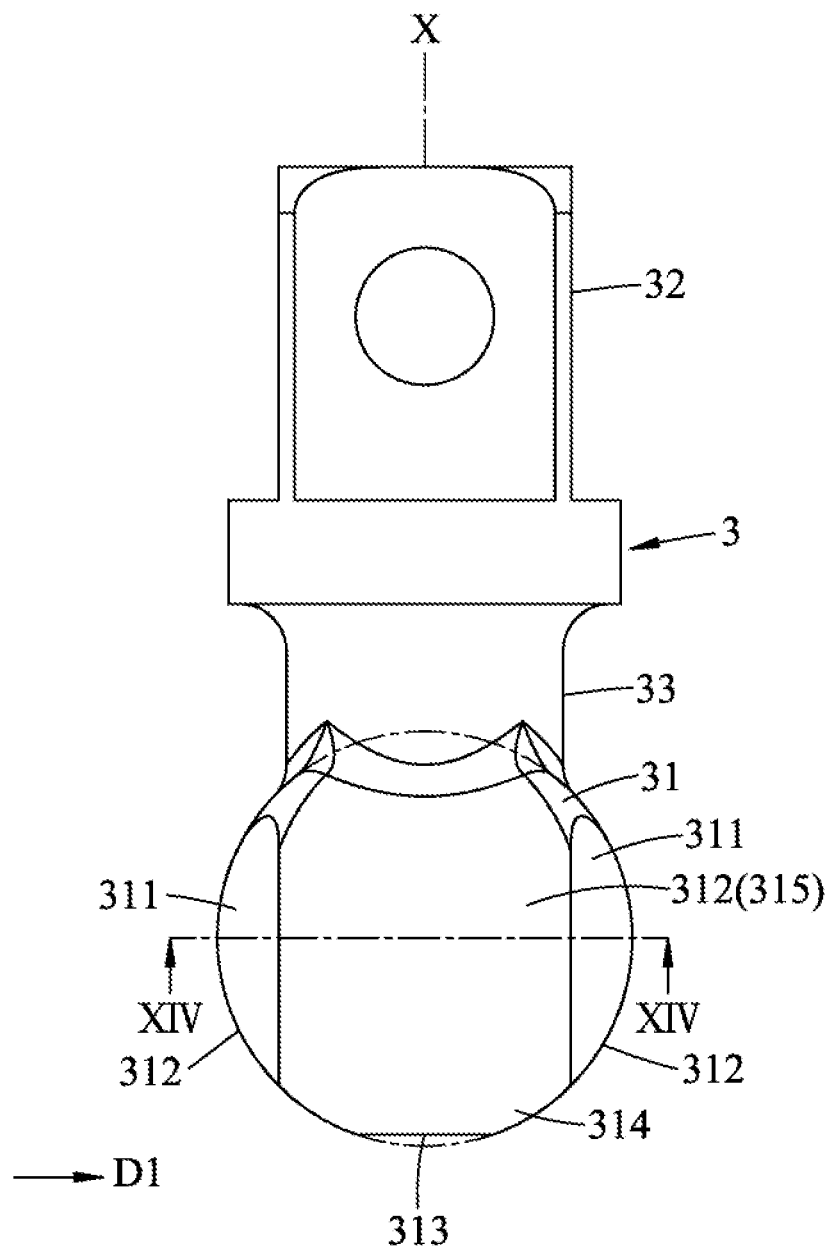
FIG. 13 is a side view of the rotating component.

Referring to FIGS. 10, 11 and 13, cross sections of two opposite ones of the contacting surfaces 312 of the rotating component 3 are co-circular, and cross sections of the other two opposite ones of the contacting surfaces 312 are co-circular.

The rotating portion 31 further has an end surface 313 that is disposed at an end thereof distal from the installation portion 32, that is connected to each of the contacting surfaces 312, and that is substantially perpendicular to the axis (X) (i.e., the axis (X) extends perpendicularly through the end surface 313). In the present embodiment, the end surface 313 is a flat, square surface; in another embodiment of the disclosure, the end surface 313 approximates to a portion of an imaginary spherical surface.

Specifically, each of the contacting surfaces 312 has a tapering segment 314 that is connected to the end surface 313, and a middle segment 315 that extends from the tapering segment 314 towards the installation portion 32. The tapering segment 314 of each of the contacting surfaces 312 is directly connected between the tapering segments 314 of two adjacent ones of the contacting surfaces 312, as best shown in FIG. 10. The middle segment 315 of each of the contacting surfaces 312 is directly connected between two adjacent ones of the corner surfaces 311.

In the present embodiment, the installation portion 32 of the rotating component 3 is configured as a steel square head with a bail catch (the ball catch is omitted in the figures), and is adapted to connect with a tool (not shown), such as a sleeve or a screwdriver. However, the installation portion 32 may also be configured as a sleeve or other tool head. In the present embodiment, the neck portion 33 has a cross section perpendicular to the axis (X) being smaller than a cross section of the installation portion 32 perpendicular to the axis (X), which facilitates rotation of the rotating component 3.

As shown in FIG. 11, two imaginary lines that extend in a first direction (D1) perpendicular to the axis (X), and that are respectively tangent to the two opposite ones of the contacting surfaces 312 are defined as first tangent lines (T1). Two imaginary lines that extend in a second direction (D2) perpendicular to both the first direction (D1) and the axis (X), and that are respectively tangent to the other two opposite ones of the contacting surfaces 312 are defined as second tangent lines (T2). Each of the first tangent lines (T1) and the second tangent lines (T2) is tangent to the middle segment 315 of a respective one of the contacting surfaces 312, and the first tangent lines (T1) and the second tangent lines (T2) intersect each other at four intersection points (P). Each of the corner surfaces 311 is disposed between an adjacent, one of the intersection points (P) and the axis (X).

By virtue of a chamfering process which renders each of the corner surfaces 311 being disposed between the adjacent one of the intersection points (P) and the axis (X), an overall size of the rotating portion 31 is reduced. It should be noted that, since the size of the rotating portion 31 of the rotating component 3 is reduced, the rotating component 3 of the present embodiment benefits therefrom with a relatively greater range of rotational motion, which results in better utility for users.

Figure 15:
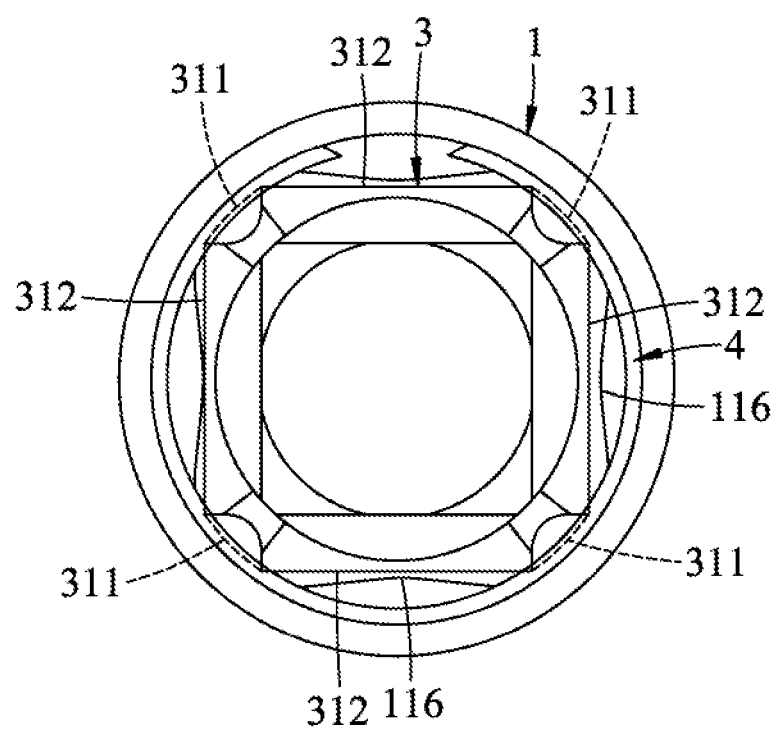
FIG. 15 is a top view of the embodiment, illustrating the center line coinciding with the axis.

Referring to FIGS. 7 and 15, the retaining unit 4 is detachably mounted in the retaining groove 106 of the barrel seat 1, and is for the corner surfaces 311 of the rotating component 3 to abut thereagainst such that the rotating component 3 is prevented from being removed from the barrel seat 1. In the present embodiment, the retaining unit 4 is configured as a flat C-shaped retaining ring (snap ring) and has a square cross section, thereby providing a better retaining effect. However, the retaining unit 4 may also be configured as a C-shaped retaining ring having a circular cross section or as other equivalent component. In the present embodiment, the rotating component 3 is prevented from being removed from the barrel seat 1 by the C-shaped retaining ring being engaged with the retaining groove 106 of the barrel seat 1. However, in another embodiment of the disclosure, the rotating component 3 may be prevented from being removed from the barrel seat 1 by installing a plurality of reliable metal beads (not shown) in the inner wall surface 101 of the barrel seat 1. In addition, the metal beads may be replaced by a bolt or a pin, as long as the rotating component 3 can be prevented from being removed.

When assembling the present embodiment, the resilient member 2 is first placed in the installation slot 113 of the barrel seat 1, and then the rotating portion 31 of the rotating component 3 is placed in the receiving slot 112 of the barrel seat 1 to abut against the small diameter end 22 of the resilient member 2. Finally, the retaining unit 4 is fitted in the retaining groove 106 of the barrel seat 1, and the assembling is completed.

Referring to FIGS. 5 and 6, before use, the barrel seat 1 is connected to the power source through the driver hole 111, and the rotating component 3 is rotated such that an angle between the axis (X) and the center line (CL) reaches a desired value. Then, the present embodiment may be used to operate a fastener (not shown).

In sum, benefits of the present embodiment according to the disclosure are as follows.

1. In the present embodiment, by virtue of the chamfering process that renders each of the corner surfaces 311 being disposed between the adjacent one of the intersection points (P) and the axis (X), a size of the receiving slot 112 of the barrel seat 1 and the size of the rotating portion 31 are reduced. In the case where specifications of the present disclosure are the same as that of the prior art, the present disclosure has the advantage of having a more compact size.

2. By virtue of the cross section of the rotating portion 31 of the rotating component 3 perpendicular to the axis (X) being generally a square with rounded corners, the corner surfaces 311 of the rotating portion 31 are not easy to wear and have high structural strength.

3. In comparison with the point contacts in the prior art, the surface contacts between the contacting surfaces 312 of the rotating component 3 and the flat surface segments 117 of the barrel seat 1 enable the present disclosure to transmit higher torques than the prior art.

4. In comparison with the prior art, since the size of the rotating portion 31 of the rotating component 3 is relatively smaller, in the case where specifications of the present disclosure are the same as that of the prior art, the rotating component 3 of the present disclosure has a greater range of rotational motion, which results in better utility for users.

In the description above, for the purposes of explanation, numerous specific details have been set forth in order to provide a thorough understanding of the embodiment. It will be apparent, however, to one skilled in the art, that one or more other embodiments may be practiced without some of these specific details It should also be appreciated that reference throughout this specification to "one embodiment," "an embodiment," an embodiment with an indication of an ordinal number and so forth means that a particular feature, structure, or characteristic may be included in the practice of the disclosure. It should be further-appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A universal socket: comprising:
    a barrel seat that includes a surrounding wall surrounding a center line, and having
        an inner wall surface that surrounds the center line and that defines
            a driver hole,
            a receiving slot opposite to said driver hole along the center line, and
            an installation slot disposed between said driver hole and said receiving slot, and spatially connected to said receiving slot,
        an outer wall surface that is opposite to said inner wall surface,
        a first surface that interconnects said inner wall surface and said outer wall surface, and that surrounds an end of said receiving slot, and
        a second surface that is opposite to said first surface in the direction of the center line, that interconnects said inner wall surface and said outer wall surface, and that surrounds an end of said driver hole, said inner wall surface having
            four receiving surface portions which surround said receiving slot, and which are arranged symmetrically about the center line, and
            four linking surface portions which surround said receiving slot, each of said linking surface portions being connected between two adjacent ones of the receiving surface portions, and having two flat surface segments which are inclined with respect to each other in a manner that said linking surface portions are convex toward the center line;
    a resilient member that is disposed in said barrel seat, that is compressible, and that has an inner end being received in said installation slot and distal from said first surface, and an outer end being proximate to said first surface;
    a rotating component that is rotatably connected to said barrel seat, that abuts against said resilient member, and that extends along an axis, said rotating component including
        a rotating portion being rotatably received in said receiving slot, having a cross section perpendicular to the axis that is generally a square with rounded corners, abutting against said outer end of said resilient member, and having
            four corner surfaces that surround the axis, each of said corner surfaces corresponding in position to a respective one of said receiving surface portions of said inner wall surface, and
            four contacting surfaces that surround the axis, each of said contacting surfaces being connected between two adjacent ones of the corner surfaces, and being configured to abut against one of said flat surface segments of a respective one of said linking surface portions of said inner wall surface, and
        an installation portion being opposite to said rotating portion along the axis; and
    a retaining unit that is mounted in said barrel seat such that said rotating component is prevented from being removed from said barrel seat;
    wherein two imaginary lines that extend in a first direction perpendicular to the axis, and that are respectively tangent to two opposite ones of said contacting surfaces are defined as first tangent lines; and
    wherein two imaginary lines that extend in a second direction perpendicular to the first direction and the axis, and that are respectively tangent to the other two opposite ones of said contacting surfaces are defined as second tangent lines, the first tangent lines and the second tangent lines intersecting each other at four intersection points, each of said corner surfaces being disposed between an adjacent one of the intersection points and the axis.

2. The universal socket as claimed in claim 1, wherein said rotating portion further has an end surface that is disposed at an end thereof distal from said installation portion, that is connected to each of said contacting surfaces, and that is substantially perpendicular to the axis.

3. The universal socket as claimed in claim 2, wherein each of said contacting surfaces has a tapering segment that is connected to said end surface, and a middle segment that extends from said tapering segment towards said installation portion, said tapering segment of each of said contacting surfaces being directly connected between said tapering segments of two adjacent ones of said contacting surfaces, said middle segment of each of said contacting surfaces being directly connected between two adjacent ones of said corner surfaces.

4. The universal socket as claimed in claim 1, wherein:
cross sections of said corner surfaces of said rotating component are co-circular;
cross sections of said two opposite ones of said contacting surfaces of said rotating component are co-circular; and
cross sections of said the other two opposite ones of said contacting surfaces are co-circular.

5. The universal socket as claimed in claim 1, wherein said installation portion is configured as a steel square head with a ball catch or as a sleeve.

6. The universal socket as claimed in claim 1, wherein said outer wall surface of said barrel seat is formed with an outer annular groove that surrounds the center line, and that is proximate to and distal from said driver hole and said receiving slot, respectively.

7. The universal socket, as claimed in claim 1, wherein said surrounding wall of said barrel seat further has at least one through hole that extends from said outer wall surface to said inner wall surface in a direction perpendicular to the center line, and that is spatially connected to said driver hole.

8. The universal socket as claimed in claim 1, wherein said rotating component further includes a neck portion that is connected between said rotating portion and said installation portion, and that has a cross section perpendicular to the axis being smaller than a cross section of said installation portion perpendicular to the axis.

9. The universal socket as claimed in claim 1, wherein said resilient member is configured as a conical compression spring, said resilient member having a large diameter end that is received in said installation slot and constitutes said inner end, and a small diameter end that is opposite to said large diameter end and that is proximate to said first surface and that constitutes said outer end.

10. The universal socket as claimed in claim 1, wherein each of said linking surface portions further has a curved surface segment that is connected between said flat surface segments of the same.

* * * * *